(12) United States Patent
Blumentritt et al.

(10) Patent No.: US 12,545,270 B2
(45) Date of Patent: Feb. 10, 2026

(54) CONTROL SYSTEM FOR A MOTOR VEHICLE FOR COORDINATING AND CARRYING OUT CUSTOMER FUNCTIONS

(71) Applicant: Volkswagen Aktiengesellschaft, Wolfsburg (DE)

(72) Inventors: Marc Blumentritt, Braunschweig (DE); Janina Cetera, Parsau (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 1192 days.

(21) Appl. No.: 17/052,154

(22) PCT Filed: Mar. 27, 2019

(86) PCT No.: PCT/EP2019/057760
§ 371 (c)(1),
(2) Date: Oct. 30, 2020

(87) PCT Pub. No.: WO2019/211049
PCT Pub. Date: Nov. 7, 2019

(65) Prior Publication Data
US 2021/0139041 A1     May 13, 2021

(30) Foreign Application Priority Data
May 3, 2018   (DE) .......................... 102018206808.9

(51) Int. Cl.
*B60W 50/08* (2020.01)
*B60W 10/04* (2006.01)
(Continued)

(52) U.S. Cl.
CPC .......... *B60W 50/082* (2013.01); *B60W 10/04* (2013.01); *B60W 10/18* (2013.01);
(Continued)

(58) Field of Classification Search
CPC .... B60W 50/082; B60W 10/04; B60W 10/18; B60W 10/20; B60W 2710/18;
(Continued)

(56) References Cited

U.S. PATENT DOCUMENTS

2007/0169007 A1* 7/2007 Hashimoto ........... B60W 50/04
                                                              717/136
2008/0140283 A1* 6/2008 Kuwahara ............. F02D 11/105
                                                              701/36
(Continued)

FOREIGN PATENT DOCUMENTS

DE  102007002197 A1   7/2008
DE  102008018058 A1   11/2008
(Continued)

OTHER PUBLICATIONS

PCT/EP2019/057760. International Search Report (Jul. 30, 2019).

*Primary Examiner* — Abby J Flynn
*Assistant Examiner* — Clint Pham
(74) *Attorney, Agent, or Firm* — Peter Zura; LOZA & LOZA, LLP (57) ABSTRACT

A control system for a motor vehicle for coordinating and carrying out customer vehicle functions and to a method for operating such a control system. The control system may include a central vehicle regulator for actuating vehicle functions and multiple customer vehicle functions which are designed to transmit activation request relating to the vehicle functions and corresponding control commands for the respective customer functions to the analysis unit of the vehicle regulator. When a currently inactive customer vehicle function transmits an activation request, the analysis unit may determine which specified activation state is assigned to said customer vehicle function according to a specified selection routine. In response thereto, the assigned activation states are transmitted to actuate the vehicle func- (Continued)

tions of the motor vehicle according to the respective control commands of the corresponding customer vehicle functions.

20 Claims, 1 Drawing Sheet

(51) Int. Cl.
*B60W 10/18* (2012.01)
*B60W 10/20* (2006.01)

(52) U.S. Cl.
CPC ......... *B60W 10/20* (2013.01); *B60W 2710/18* (2013.01); *B60W 2710/20* (2013.01); *B60W 2720/106* (2013.01); *B60W 2720/125* (2013.01)

(58) Field of Classification Search
CPC ....... B60W 2710/20; B60W 2720/106; B60W 2720/125; B60W 2050/0006; B60W 2050/0094; B60W 30/143; B60W 10/184; B60W 30/06; B60W 30/12; B60W 30/16; B60W 30/18163
See application file for complete search history.

(56) References Cited

U.S. PATENT DOCUMENTS

| | | | |
|---|---|---|---|
| 2012/0203424 A1* | 8/2012 | Filev | ............ B60W 50/00 701/36 |
| 2017/0364070 A1* | 12/2017 | Oba | ............ G05D 1/0061 |

FOREIGN PATENT DOCUMENTS

| | | |
|---|---|---|
| DE | 102010001045 A1 | 7/2011 |
| DE | 102011084619 A1 | 4/2013 |
| DE | 102011085325 A1 | 5/2013 |
| DE | 112012007124 T5 | 7/2015 |
| DE | 102016124708 A1 | 10/2017 |
| WO | 2004085220 A1 | 10/2004 |
| WO | 2005063524 A1 | 7/2005 |
| WO | 2009149895 A1 | 12/2009 |
| WO | 2013056882 A1 | 4/2013 |
| WO | 2015070996 A1 | 5/2015 |
| WO | 2018029052 A1 | 2/2018 |

* cited by examiner

CONTROL SYSTEM FOR A MOTOR VEHICLE FOR COORDINATING AND CARRYING OUT CUSTOMER FUNCTIONS

RELATED APPLICATIONS

The present application claims priority to international Patent Application No. PCT/EP2019/057760 to Blumentritt, et al. titled Control System for a Motor Vehicle for Coordinating and Carrying Out Customer Functions, Method for Operating Such a Control System, and Motor Vehicle Comprising Such A Control Function", filed Mar. 27, 2019, which claims priority to German Patent App. No. DE 102018206808.9 to Blumentritt, et al., filed May 3, 2018, the contents of each being incorporated by reference in their entirety herein.

BACKGROUND

The present disclosure relates to a control system for a motor vehicle for coordinating and carrying out customer vehicle functions, a method for operating such a control system, and a motor vehicle that has such a control system.

Customer vehicle functions, such as driver assistance functions, are normally inter-coordinated in a decentralized manner in a vehicle. This means that the manner in which each of the customer vehicle functions is to behave when another customer vehicle function is active is stored in the control unit. With a low number of customer vehicle functions in a motor vehicle, for example, when only a few functions of driver assistance systems are available to a user of the motor vehicle, the complexity associated with the coordination between the individual customer vehicle functions is relatively low. The number of customer vehicle functions in motor vehicles is constantly increasing, however, resulting in a significant increase in the complexity of coordinating the individual customer vehicle functions. On the whole, with a decentralized implementation, the difficulties involved in this coordination are constantly increasing, which means that in particular with safety-relevant customer vehicle functions for operating the motor vehicle, this may require more time and the complexity should therefore be reduced.

A decision making system for combined automatic driver assistance is described in DE 10 2016 124 708 A1, which can be installed in a vehicle for automatic driver assistance. This decision-making system comprises a driver assistance device comprising automatic longitudinal control and a driver assistance device comprising automatic lateral control, and a sensor device for detecting the state of a vehicle and the state of the environment. The decision-making system can then determine, on the basis of the state of the vehicle and the state of the environment, whether the driver assistance device that has automatic longitudinal control or the driver assistance device comprising automatic lateral control needs to be shut off to improve the safety performance of a motor vehicle autopilot.

A driving assistant for a motor vehicle is described in DE 10 2010 001 045 A1. This driving assistant comprises a decision-making device that is configured to select a driving strategy based on the gradient of a roadway and target driving dynamics.

A method with which interventions in a vehicle system without the input of a vehicle driver can be determined is described in WO 2004/085220 A1. This method is based on a risk calculator that evaluates risks to the motor vehicle and people in the vicinity of the motor vehicle on the basis of predefined vehicle data, environment data, and current vehicle and driver or personal data. Control signals are then issued, depending on the results obtained from this risk calculator, taking certain criteria into account, with which actuators in the motor vehicle are activated such that a maximum level of safety is obtained, both for people and the motor vehicle.

Technologies and techniques are need in which numerous customer vehicle functions can be coordinated and carried out in a motor vehicle in a particularly advantageous manner.

BRIEF SUMMARY

In some examples, control systems are disclosed for a motor vehicle for coordinating and carrying out customer vehicle functions, and a method for operating such a control system for a motor vehicle.

An exemplary control system for a motor vehicle may be configured for coordinating and carrying out customer vehicle functions, where the control system may include, but is not limited to, a central vehicle control for controlling vehicle functions, and numerous vehicle functions, which are configured to transmit the activation requests relating to vehicle functions and associated control commands for the respective customer functions to an evaluation unit in the vehicle control. The evaluation unit in the vehicle control may be configured to determine, according to a predetermined selection routine, which predetermined activation state is assigned to a currently inactive customer function and, if applicable, to a currently active customer function when a currently inactive customer function issues an activation request, and to transmit the associated activation states to the corresponding customer functions and the vehicle control. The vehicle control may be configured to control the vehicle functions of the motor vehicle according to the respective control commands of the corresponding customer vehicle functions for executing the respective customer functions.

BRIEF DESCRIPTION OF THE DRAWINGS

Exemplary embodiments are described below. In this regard.

DETAILED DESCRIPTION

In some examples, a system for controlling a motor vehicle is disclosed, with which activation requests from customer functions can be organized and carried out. A control system may contain a vehicle control that has an evaluation unit, numerous vehicle functions that can be controlled by the vehicle control, and numerous customer vehicle functions. The customer vehicle functions may each contain customer functions, for example, where each customer vehicle function is assigned at least one specific task or role in the motor vehicle. In order to implement a customer function intended with a customer vehicle function, the individual vehicle functions in the motor vehicle, which normally comprise steering, braking, and powering the vehicle, may be controlled.

The customer vehicle functions are also configured to send activation requests to the evaluation unit in the vehicle control that relate to the respective vehicle functions necessary for carrying out the corresponding customer functions of the customer vehicle functions. In addition to these activation requests, which in the simplest cases simply contain the information that the corresponding customer function wants to access the vehicle functions in the motor vehicle, corresponding control commands, for example, detailed information regarding activating the vehicle functions relating to carrying out the corresponding customer function, are sent to the evaluation unit in the vehicle control. After the evaluation unit in the vehicle control has received such an activation request from a previously inactive customer vehicle function, the evaluation unit is configured to evaluate the activation request for this customer vehicle function according to a specific evaluation guideline, the so-called selection routine. In some examples, each customer vehicle function may be assigned a so-called activation state, which contains information regarding whether a customer vehicle function should currently be activated or deactivated. The evaluation unit may therefore be configured to determine whether a previously inactive customer vehicle function should be activated in the motor vehicle according to the control commands. Such an activation state is also determined for a currently active customer vehicle function, if a customer vehicle function is currently active in the control system.

The activation states that are assigned and determined in this manner may then be sent to one of the previously inactive customer vehicle functions and, if applicable, to the previously activated customer vehicle function, as well as the vehicle control. When the motor vehicle is controlled by the vehicle control, the activation states for the individual customer vehicle functions that have been sent to the vehicle control are taken into account, and the vehicle is controlled on the basis of this information and according to the control commands from the participating customer vehicle functions in the vehicle control.

If, for example, a motor vehicle driving with a speed control, e.g., cruise control, finds itself in a situation in which an automatic distance control, an ACC (adaptive cruise control) system is activated, the control method may be configured to determine whether the newly activated driver assistance system (adaptive cruise control) can access the control of the motor vehicle or not. The cruise control and the adaptive cruise control may be configured as two separate customer vehicle functions, each of which are configured to control vehicle functions, such as the actuators controlling the speed of the vehicle, at least indirectly, with their respective control commands. When the adaptive cruise control is activated, an activation request for this customer vehicle function and corresponding control commands for the adaptive cruise control in the motor vehicle may be transmitted to the evaluation unit in the vehicle control. The evaluation unit may then be configured to determine whether the two customer vehicle functions need to be activated, deactivated, or paused as the vehicle continues to travel. In this situation, the selection routine typically results in deactivation of the cruise control, while the adaptive cruise control takes over control of the motor vehicle.

In some examples, the motor vehicle may not be controlled directly by the adaptive cruise control, for example, through accelerating and braking the motor vehicle in this situation, but instead by the central vehicle control, which in turn has received information from its evaluation unit regarding which customer vehicle functions have been assigned which activation states, subsequently implementing the control commands for the adaptive cruise control by controlling the corresponding vehicle functions, such as braking and powering the motor vehicle.

As a result, numerous customer vehicle functions can therefore be coordinated and ultimately carried out using the control system according to the present disclosure via a central vehicle control that has a central evaluation unit for the vehicle control. As a result, any conflicting activation of vehicle functions for steering, braking and accelerating the motor vehicle due to uncoordinated customer vehicle functions is prevented. The control system ultimately ensures that it is first checked in a motor vehicle whether a customer vehicle function that issues an activation request actually should be activated, or whether this should not be the case, e.g. for safety or comfort reasons.

In some examples, the vehicle control may be configured to steer, brake, and/or accelerate the motor vehicle by controlling the vehicle functions. The vehicle control therefore forms a central device in the control system, and ultimately in the motor vehicle, by means of which the motor vehicle can be controlled. The vehicle control can therefore access the steering, braking and control of the motor in the motor vehicle. The vehicle control thus forms the connection between the individual customer vehicle functions and their corresponding control and evaluation units and the individual vehicle functions, which are typically actuators that can convert electrical signals into mechanical movements. This is particularly advantageous because the customer vehicle systems no longer need to be individually configured to activate the individual actuators in the motor vehicle, e.g. via data busses between the control units in the customer vehicle systems and the actuators selected for this, but instead, it is possible to activate the actuators using corresponding communication signals sent to the evaluation unit and the central vehicle control itself. As a result of this central vehicle control, it is therefore possible to coordinate and carry out customer vehicle functions with relatively little difficulty using an evaluation unit in this central vehicle control.

In some examples, the customer vehicle functions may include driver assistance systems for the motor vehicle. These customer vehicle functions are thus additional electronic devices in motor vehicles for assisting the user of the motor vehicle in specific driving situations. A customer vehicle function can be, for example, adaptive cruise control (ACC system), sometimes referred to as a distance regulating cruise control, a lane change assistance, a speed control device, cruise control, a lane keeping assistance, or a parking assistance. Some or all of these driver assistance systems in the form of customer vehicle functions are therefore configured to send activation requests relating to vehicle functions and associated control commands for their respective customer functions, i.e. the respective assistance functions in these driver assistance systems, to the evaluation unit in the vehicle control. An adaptive cruise control can send, e.g., an activation request and control commands for regulating the distance of the motor vehicle to other objects to the evaluation unit. The control system according to the present disclosure, which may comprise all of the driver assistance systems in the form of customer vehicle functions for the motor vehicle, therefore enables a simply organized coordination between the individual driver assistance systems, because it is possible for the central vehicle control and its evaluation unit to access all of the driver assistance systems.

In some examples, an evaluation unit may be configured to at least distinguish between the active, inactive, and paused customer vehicle functions. The activation states of the individual customer vehicle functions determined in the framework of the selection routine can therefore be implemented by the individual customer vehicle functions in that they activate, deactivate or pause them, i.e. rendering them temporarily inactive. If, for example, the motor vehicle is currently driven using cruise control set to a predefined speed on a highway, various activation states for the cruise control are possible when a command for activation of another customer vehicle function is issued, e.g. lane change assistance, or adaptive cruise control. If there is an activation request for the lane change assistance, the cruise control may remain active, or it may be paused. If the customer vehicle function determined by the activation request is adaptive cruise control, however, it can be expected that the cruise control will be deactivated, and is therefore assigned an inactive activation state. Numerous combinations of customer vehicle functions can therefore be coordinated and ultimately carried out according to the assigned activation states using the three activation states: active, inactive, and paused. These three activation states are also distinct, such that conflicting control due to unclearly assigned activation states, or evaluations by the selection routine, can be prevented.

In some examples, if no customer vehicle function is activated, the evaluation unit may be configured to issue permission to activate the first currently inactive customer vehicle function that sends an activation request via the activation state transmitted for this customer vehicle function. If, therefore, no customer vehicle function is currently activated in the motor vehicle, the first customer vehicle function to send an activation request to the evaluation unit in the vehicle control is automatically activated. It does not matter which customer vehicle function sends an activation request to the evaluation unit in this case because only the first activation request sent to the evaluation unit, or the first received by the evaluation unit, results in permission for the customer vehicle function for which information has been sent to be active. If, for example, a motor vehicle is being manually driven on a road by a user of the motor vehicle, when the user of the motor vehicle activates the adaptive cruise control, this customer vehicle function is automatically activated without further coordination or evaluation of the activation request and the associated control commands for the adaptive cruise control. This advantageously enables activation of a first customer vehicle function in the motor vehicle.

In some examples, if a customer vehicle function is already activated, the evaluation unit may be configured to determine a predetermined transition scenario between the two customer vehicle functions in the framework of the selection routine, as soon as it receives an activation request for a currently inactive customer vehicle function, and to then assign a predetermined activation state to each of the two customer vehicle functions in accordance with the determined transition scenario, and to transmit this. If, therefore, a previously inactive customer vehicle function sends an activation request to the evaluation unit, even though another customer vehicle function is already active, various coordination scenarios between the competing customer vehicle functions are defined. Based on these coordination scenarios, referred to herein as transition scenarios, the selection routine determines which customer vehicle function will be activated, deactivated, or paused, or it receives the information regarding which is to be activated, deactivated, or paused. In the framework of these transition scenarios, there are various combinations of activation states for the already active customer function and the still inactive customer vehicle function that has sent an activation request to the evaluation unit.

It can therefore be determined in the framework of the selection routine whether control of the vehicle functions is to be taken over by control commands from the currently inactive customer vehicle function that has sent an activation request to the evaluation unit. If, for example, the cruise control is first activated, when the adaptive cruise control is activated, such a takeover of the control of the vehicle functions through control commands by the previously inactive adaptive cruise control can be determined in the framework of the selection routine, and the corresponding activation states are sent to the two customer vehicle functions. In this case, the cruise control is sent the inactive activation state (it is required to deactivate itself) and the adaptive cruise control is sent the active activation state, (it is allowed to activate itself). As a result, a particularly advantageous and quick coordination of the customer vehicle functions is therefore enabled by using the transition scenarios, based on provisions stored in the evaluation unit.

In another example, the evaluation unit may be configured to determine one of the following predetermined transition scenarios between the two customer vehicle functions in the framework of the selection routine, in order to coordinate the two respective customer functions to one another. These transition scenarios involve taking over control of the vehicle functions through control commands from the currently inactive customer vehicle function, an overriding of the control of the vehicle functions through control commands from the currently inactive customer vehicle function without deactivating the active customer vehicle function, a parallel control of the vehicle functions through control commands from the active and the currently inactive customer vehicle functions, prevention of the control of the vehicle function through the control commands from the currently inactive customer vehicle function, or reservation of the control of the vehicle functions through control commands from the currently inactive customer vehicle function, until predetermined activation requirements are satisfied.

There may be a plurality (e.g., five) of different so-called transition scenarios for coordinating the activation, deactivation or pausing of the various customer vehicle functions.

In a takeover a transition scenario, the currently inactive customer vehicle function is assigned and sent the active activation state, and the previously active customer vehicle function is assigned and sent the inactive activation state.

In an override transition scenario, the currently inactive customer vehicle function is assigned the active activation state, wherein the previously active customer vehicle function is assigned and sent the paused activation state instead of the inactive activation state. The previously active customer function therefore remains passively active in an "on hold" state. As soon as the overriding customer vehicle function has carried out its customer function and then deactivated itself, the previously active customer vehicle function can then be released from its paused mode and resume its active state. The overriding therefore represents a temporary control of the vehicle functions through control commands from the currently inactive customer vehicle function that has sent an activation request to the evaluation unit.

In a parallel activation transition scenario, the currently inactive customer vehicle function is assigned the active activation state, and the previously active customer vehicle function is likewise assigned the active activation state. In this transition scenario, both customer vehicle functions are active at the same time, and engage with the corresponding vehicle functions for a corresponding control by the vehicle control. If both the currently inactive and the currently active customer vehicle functions engage with the same vehicle function, the manner in which the control commands for the customer vehicle functions that are now active in parallel are carried out is determined by a predefined provision. Such a provision can define minimum and maximum values for the control of the corresponding vehicle functions.

In a prevention transition scenario, a currently inactive customer vehicle function may be assigned the inactive activation state, and the previously active customer vehicle function retains the active activation state. In this transition scenario, an activation of the vehicle function according to the control commands from the previously inactive customer vehicle function that has sent an activation request to the evaluation unit is rejected, and the motor vehicle remains under the control of the already active customer vehicle function, which remains active.

With a reservation transition scenario, the currently inactive customer vehicle function that has sent an activation request to the evaluation unit is paused, due to the currently active customer vehicle function, and must wait until the currently active customer vehicle function becomes inactive. The currently inactive customer vehicle function that has sent an activation request to the evaluation unit is therefore in a type of standby situation in this transition scenario, and the activation thereof is held in reserve, until it can actually be activated, and the previously activated customer vehicle function becomes inactive.

A takeover of the control of the vehicle functions through control commands from the currently active customer vehicle function may take place, for example, when the active customer vehicle function is a speed regulating system, such as a cruise control, and when the currently inactive customer vehicle function that has sent an activation request to the evaluation unit in the vehicle control is an automatic distance regulation, e.g., an ACC system. In this situation, the cruise control may be informed on the basis of the activation state that this customer vehicle function is to be deactivated, while the adaptive cruise control has been given permission for activation, and thus to take over control of the corresponding vehicle functions.

In some examples, an overriding of the control of the vehicle function may be configured through control commands from the active customer vehicle function without deactivating the active customer vehicle function takes place, for example, when the previously active customer vehicle function is a lane keeping assistance, and when the currently inactive customer vehicle function is a lane change assistance. The lane keeping assistance may only engage with its control commands in the lateral control of the motor vehicle. The lane change assistance also engages with the lateral control, i.e. the steering, of the motor vehicle, but this customer vehicle function is normally only active for a limited time. When the lane keeping assistance is the currently active customer vehicle function, it is first informed by the evaluation unit that it will be paused, while the lane change assistance is given activation permission, based on the corresponding transmitted activation state. After the lane change, for example, after the lane change assistance has carried out its customer function, e.g., the lane change, the lane keeping assistance is reactivated, and the pause function of the lane keeping assistance is terminated. The lane change assistance thus overrides the lane keeping assistance while it is carrying out its customer function.

In some examples, a parallel activation of the vehicle functions through control commands from the active and the currently inactive customer vehicle functions may take place, for example, when the lane keeping assistance is already active, and an automatic distance regulation, e.g., an ACC system, has sent an activation request to the evaluation unit. The lane keeping assistance only engages with the lateral control of the motor vehicle for its customer function, while the adaptive cruise control controls the motor vehicle in the longitudinal direction, because the implementation of the customer function with this customer vehicle function only affects the acceleration and braking of the motor vehicle. These two customer vehicle functions can therefore be active in parallel, in accordance with the parallel activation transition scenario.

In another example of a parallel activation of the vehicle functions, the already active customer vehicle function is a speed limiter, which specifies a speed limit, and the previously inactive customer vehicle function is a cruise control. These two customer vehicle functions can be activated in parallel, wherein the speed limiter defines a maximum speed, which cannot be exceeded through the control commands from the cruise control. There is also a provision in this example regarding the maximum value for the activation of the corresponding vehicle function. When the two active customer vehicle functions are simply an emergency braking assistance and a distance regulator, instead of a predefined maximum value, the provision can dictate that in the case of a braking command from both customer vehicle functions, the stronger deceleration of the motor vehicle is always carried out by the vehicle control.

A prevention of the activation of the vehicle function through the control commands form the currently inactive customer vehicle function can be implemented, for example, when the previously active customer vehicle function is an advanced driver assistance system for autonomous driving on a highway. If some other customer vehicle function, e.g. the adaptive cruise control, then sends out an activation request, this adaptive cruise control is not activated, and instead is prevented from activation, because the advanced driver assistance system for autonomous driving on a highway can control all of the necessary vehicle functions, and therefore has priority and remains active.

In the prevention transition scenario, the previously active customer vehicle function can also be paused in the activation state in certain circumstances. This is the case, for example, when a customer vehicle function A overrides a customer vehicle function B, such that the customer vehicle function A is active and the customer vehicle function B is paused. Another customer vehicle function C, which is currently inactive, could then be prevented by the currently paused customer vehicle function B.

In some examples, a reservation of the control of the vehicle function through control commands from the currently inactive customer vehicle function can be implemented until predetermined activation conditions have been satisfied, for example, when the already active customer vehicle function is an adaptive cruise control, and the currently inactive customer vehicle function is an intelligent parking assistance. The adaptive cruise control remains active in this situation, until a parking space has actually been found and selected in which the motor vehicle is to be parked using the intelligent parking assistance. The adaptive cruise control is first deactivated if this parking space is selected and the motor vehicle has reached an appropriate starting position for the parking procedure, and the intelligent parking assistance that has remained paused until this time is then activated, or is assigned and sent the corresponding activation state. The intelligent parking assistance then remains in the standby state until the prerequisites for its activation and the associated execution of its customer function, i.e. intelligent parking, are satisfied.

Using the transition scenarios described above, it is therefore possible to prevent conflicting activation of the vehicle functions in the motor vehicle by the vehicle control due to corresponding control commands from the individual customer vehicle functions.

In another advantageous embodiment of the present disclosure, the evaluation unit is configured to carry out the selection routine at predetermined intervals, and to send the currently determined activation states to the corresponding customer vehicle functions. The coordination of the individual customer vehicle functions thus does not take place just once, but instead takes place repeatedly, in predetermined cycles. The selection routine is carried out in specific intervals, in which it is determined which predetermined activation states are, and may be, assigned to the currently inactive customer vehicle function and the already active customer vehicle function. The customer vehicle functions as well as the vehicle control are then sent the results of the selection routine in predetermined intervals, in the form of the determined activation states. A new determination and renewed transmission of the activation states to the customer vehicle functions and the vehicle control can therefore take place every 20 milliseconds, for example. As a result, all of the components in the control system are always as up-to-date as possible, and therefore have access to information regarding the coordination and execution of the customer vehicle functions.

Alternatively or in addition to carrying out the selection routine in predetermined intervals, this can also take place when a customer vehicle function changes its activation state, and sends the new activation state to the evaluation unit. The selection routine can therefore be executed depending on an event.

It is also possible to inform not only the customer vehicle functions that are active, or have sent an activation request to the evaluation unit, of the current activation states, but to always inform all of the customer vehicle functions in the motor vehicle of the current activation states, by sending these activation states to them. Alternatively, it is also possible to control the transmission of the activation states to the evaluation unit dynamically, e.g. in that all of the active or previously active customer vehicle functions are registered with the evaluation unit during this use of the motor vehicle, and are informed of their current respective activation states during this use.

In some examples, if numerous customer vehicle functions send activation requests to the evaluation unit within the same time interval, the evaluation unit is configured to carry out the selection routine for each activation request individually, and in the order in which the valid activation requests were first received by the evaluation unit (4). If numerous activation requests are received at basically the same time by the evaluation unit, the coordination of the execution of these customer vehicle functions takes place in the framework of the control system, i.e. in the sequence of the queries by the customer vehicle functions. Normally, the first activation request received from a customer vehicle system is placed in relationship with the already active customer vehicle function in the framework of the selection routine, and the corresponding transition scenario, and thus the corresponding activation states of the two customer vehicle functions are determined. Subsequently, based on the results of this selection routine, the customer vehicle function that first sends an activation request to the evaluation unit is then placed in relationship to the customer vehicle functions that were determined to be active or paused in the previous, first selection routine, in a subsequent selection routine.

If a selection routine results in two customer vehicle functions being activated in parallel, the transition scenarios for the two active customer vehicle functions are checked if another customer vehicle function issues an activation request, and the corresponding activation requests are sent to all relevant customer vehicle functions. Even if this means checking numerous transition scenarios between individual customer vehicle functions, the selection routine is still carried out individually for each customer vehicle function that sends an activation request to the evaluation unit. This advantageously reduces or prevents potential conflicts in the activation of customer vehicle functions.

The activation request is therefore checked in the framework of the selection routine with regard to all active and paused customer vehicle functions. If there are different results with regard to the activation of a customer vehicle function when taking numerous active and paused customer vehicle functions into account, the selection takes place according to the following prioritization sequence, starting with the transition scenario with the highest priority: prevention, reservation, takeover, override, parallel activation.

If, for example, the two customer vehicle functions A and B are active, the customer vehicle function C sends out an activation request, and if the customer vehicle function combination A-C results in a takeover by C, in which the customer vehicle function combination B-C results in a reservation, then according to the priority sequence for the transition scenario, reservation is selected by the customer vehicle function B for the customer vehicle function C due to the higher priority of this transition scenario. The customer vehicle function A is not taken over by the customer vehicle function C, i.e. the customer vehicle function A remains activated. If instead, the customer vehicle function C is granted the override scenario with regard to the customer vehicle function B, the customer vehicle function A would be deactivated due to the takeover by C, and the customer vehicle function B would be paused due to the override by C. The customer vehicle function C would then be active.

If there is a takeover by the adaptive cruise control, for example, over the previously active cruise control, when another activation request is received, e.g. from the parking assistance, instead of carrying out the selection routine between the already overridden cruise control and the parking assistance, a selection routine is carried out between the now-active adaptive cruise control and the parking assistance.

In some examples, the customer vehicle functions may include confirmations from at least one control element in the motor vehicle by a user of the motor vehicle for manual control of a vehicle-side execution unit, which may be coupled to the control element for signal transfer, and is mechanically decoupled from the control element. In this case, the customer vehicle functions are not necessarily driver assistance systems in the motor vehicle, but instead, the input or influence of the user of the motor vehicle on the vehicle functions in the motor vehicle can also be regarded as customer vehicle functions. This is then possible if the motor vehicle has electric brakes, accelerator, or steering.

With electric steering, such as a so-called steer-by-wire system, a steering command is sent, electrically, from a sensor, which is normally located in the steering wheel, via a control unit, to an electromechanical actuator that carries out the steering command. With this type of system, there is therefore no mechanical connection between the steering wheel and the vehicle wheels that are steered. The same is the case with an electric brake system, a brake-by-wire system, in which the actuator for this brake system is mechanically decoupled from a transmission device for the brake command. Analogously, there can also be an electric and mechanically decoupled accelerator pedal, a drive-by-wire system, in the motor vehicle. With this type of manual control of the motor vehicle, control signals generated by the user of the motor vehicle can therefore be regarded as control commands from customer vehicle functions, in a manner analogous to that with the signals from typical driver assistance systems. These control commands, as well as corresponding activation requests for carrying out these control commands are likewise coordinated via the evaluation unit in the vehicle control, and the execution thereof is ultimately permitted or prevented by the vehicle control.

One example of such a customer vehicle function would be an actuation of an electric accelerator pedal by a user of the motor vehicle, a use of the brake pedal in the motor vehicle by the user, or a corresponding actuation of the electric steering wheel. In that an input by a user, e.g. a driver of the motor vehicle, is regarded as a customer vehicle function, like a driver assistance system, the control system also particularly advantageously enables coordination between manual control commands from the user of the motor vehicle and active or previously inactive customer vehicle functions.

In some examples, if the actuation by the user of the motor vehicle is sent to the evaluation unit as a corresponding activation request, the evaluation unit may be configured to take further predefined selection criteria into account in the framework of the selection routine. If an actuation of at least one control element in the motor vehicle by a user of the motor vehicle for the manual control of a vehicle-side execution unit takes place in the form of a customer vehicle function, this actuation would not necessarily be regarded as a firmly defined customer vehicle function, for which there are firmly defined rules in the selection routine and the transition scenarios taken into account thereby. With this type of customer vehicle function, it is possible to draw on additional predefined conditions, so-called selection criteria in the framework of the selection routine, in order to be able to determine the corresponding activation states of the participating customer vehicle functions.

Using a predefined selection criteria, it is possible, for example, that a braking intention on the part of the user of the motor vehicle, even if the braking intention by the user is weaker than a braking command from a previously active customer vehicle function, e.g. adaptive cruise control, overrides all driver assistance systems is stored in the control system, i.e. the evaluation unit in the vehicle control. As a result, the previously activated customer vehicle function is always deactivated, i.e. it receives the corresponding activation state, in the case of a manual braking by the user of the motor vehicle, because the user intention, i.e. the input from the user through the actuation of the corresponding control element, always results in an override. It would also be possible that the braking intention by the user is only taken into account for controlling the brakes of the motor vehicle by the vehicle control if the braking power intended by the user is greater than or equal to the braking provided by the current customer vehicle function. By way of example, if the cruise control is activated, a deactivation, or at least a pausing of the cruise control only occurs if the user brakes more forcefully than the cruise control would, based on its control commands. Depending on the selection criteria, this could also result in a takeover or override of the cruise control by the user's intention. Taking the actuation of a control element in the motor vehicle by the user of the motor vehicle into account as a customer vehicle function means that a particularly distinctive control system for coordinating and carrying out customer vehicle functions and manual user intentions can be obtained.

In some examples, the customer vehicle function is configured to send a task key describing the respective customer function to the evaluation unit, in addition to the respective activation requests and the associated control commands, wherein the vehicle control is configured to offer predetermined tasks, the task keys of which are stored in the evaluation unit, and additional customer vehicle functions can be integrated in the control system if the respective customer functions of this customer vehicle function can be described with the task keys known to the evaluation unit. The customer vehicle functions are thus configured to send, in addition to the aforementioned activation requests and the control commands, signal information pertaining to the role played by the respective customer function in the motor vehicle to the evaluation unit in the form of a so-called task key. Information pertaining to precisely defined tasks of individual customer vehicle functions is thus contained in the evaluation unit. These tasks are stored in the evaluation unit in the form of clearly defined task keys. The central evaluation unit and the vehicle control are therefore ultimately configured to offer various services, e.g. setting a speed, emergency braking, or carrying out specific steering commands.

Further functions that have not yet been stored in the evaluation unit can be added by updating the evaluation unit, and thus acquired by the vehicle control and its evaluation unit. This means that new or revised customer vehicle functions can be added to a motor vehicle that is already in operation. The evaluation unit can also be configured to compare the transmitted task keys with the roles it knows of. If a certain task key is the task key for parking, for example, the evaluation unit first compares this information with the functions of customer vehicle functions that it already contains. If it knows of the parking function, it then has information regarding which vehicle functions must be controlled in the framework of this task, as well as information regarding the corresponding transition scenarios between various customer vehicle functions in the framework of the selection routine.

Alternatively or in addition, it is also possible that, independently of the transmitted task keys, additional customer vehicle functions can be integrated in the control system for the motor vehicle to coordinate and carry out customer vehicle functions through a general updating of the evaluation unit.

In some examples, methods are disclosed for operating the control system for a motor vehicle described herein, to coordinate and carry out customer vehicle functions. A method may comprise: transmitting activation requests relating to the vehicle functions and the associated control commands for its respective customer functions, from at least one of the customer vehicle functions, which is currently inactive, to the evaluation unit; assigning a predetermined activation state to the currently inactive customer vehicle function that issued the activation request, and, if applicable, to an already active customer vehicle function, according to the selection routine; transmitting the assigned activation states to the corresponding customer vehicle functions and the vehicle control; and executing the respective customer function by the vehicle control in accordance with the respective control commands for the corresponding customer vehicle function.

A motor vehicle that has the control system describe above is also contemplated in the present disclosure, which is configured to carry out the method described above for operating the control system described above in the motor vehicle to coordinate and carry out customer functions.

The present disclosure also includes further and/or additional developments of the subject matter discussed herein, and may include features that have already been described in conjunction with the further developments of the motor vehicle according to the present disclosure. For this reason, these developments of the method according to the present disclosure shall not be described again for the purposes of brevity.

The components of the embodiment described in the exemplary embodiment herein each represent individual features of the present disclosure that are to be regarded independently of one another, which are each developed independently by the present disclosure, and can thus be regarded as a component of the present disclosure, individually or in a combination other than that shown. Moreover, the embodiment described herein can also be supplemented by features of the present disclosure other than those already described.

All elements with identical functions are given the same reference symbols in the figures.

Figure 1:
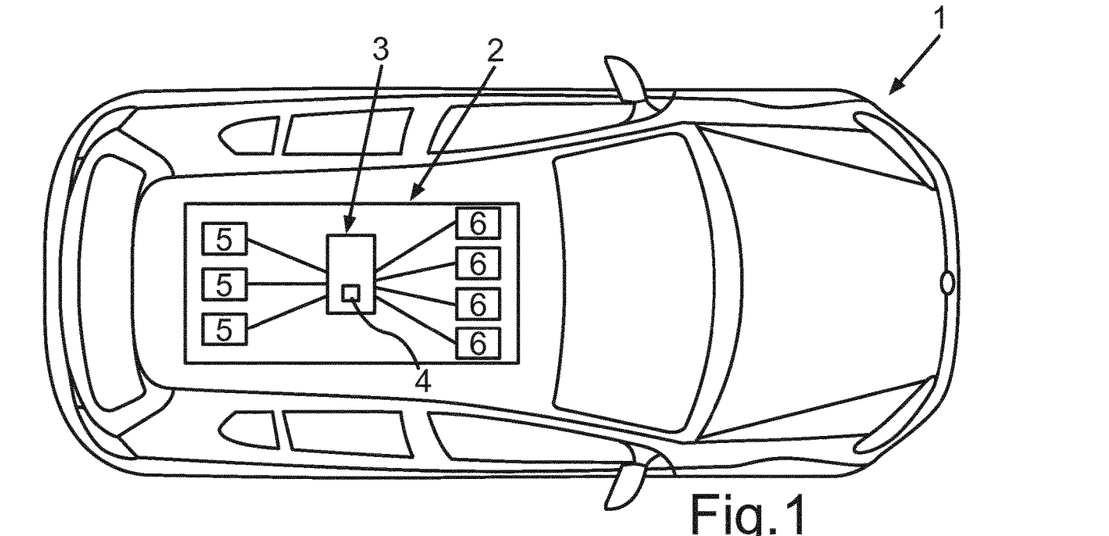
FIG. 1 shows a schematic illustration of a motor vehicle that has a control system for coordinating and carrying out customer vehicle functions.

FIG. 1 shows a drawing of a motor vehicle 1 that includes a control system 2 for coordinating and carrying out customer vehicle functions 6. The control system 2 may include a vehicle control 3 that contains an evaluation unit 4 and numerous vehicle functions 5 and customer vehicle functions 6. The vehicle function 5 can be braking, steering, or powering the motor vehicle 1, for example. The customer vehicle functions 6 may be configured as an adaptive cruise control 21 (see reference symbol 21 in FIG. 2), e.g., an ACC system, a parking assistance 25 (see reference symbol 25 in FIG. 2), a lane keeping assistance (see reference symbol 22 in FIG. 2), a cruise control (see reference symbol 20 in FIG. 2) or electric brakes for the motor vehicle 1 that can be manually operated by a user of the motor vehicle 1, e.g., a so-called brake-by-wire system.

The central vehicle control 3 may be configured to control the vehicle functions 5. The customer vehicle functions 6 may be configured to send the activation request pertaining to the vehicle function 5 and the associated control commands for their respective customer function to the evaluation unit 4 in the vehicle control 3. If the customer vehicle function 6 is the lane keeping assistance 22, for example, the corresponding customer function would be keeping the vehicle within a lane. If, for example, the lane keeping assistance 22 is activated through the activation of a corresponding actuator in the vehicle interior by a user of the motor vehicle 1, it sends a corresponding activation request and the corresponding control commands relating to lane keeping in accordance with the provisions of the lane keeping assistance 22 to the evaluation unit 4. The evaluation unit 4 then determines whether the lane keeping assistance 22 is to be operated in an activated, not activated, or paused state according to a predetermined selection routine 7 (see reference symbol 7 in FIG. 2). The evaluation unit 4 therefore determines an activation state for the previously inactive customer vehicle function 6, e.g., the lane keeping assistance 22, that sent an activation request to the evaluation unit 1, in the framework of the selection routine 7.

If none of the customer vehicle functions 6 are active, the lane keeping assistance 6 may be activated without checking. If another customer vehicle function 6 was already activated, however, such as cruise control 20, the two customer vehicle functions 6 are assigned activation states, i.e. the lane keeping assistance 22 and the cruise control 20, according to the predetermined selection routine 7. The activation states that are obtained, distinguished in principal between active, inactive and paused, are sent to the corresponding customer vehicle functions 6 and the vehicle control 3. The vehicle control 3 is configured to subsequently control the vehicle functions 5 in the motor vehicle according to the corresponding control commands from the now activated, or paused, customer vehicle function 6 for executing the respective customer function, taking into account the assigned activation states for the vehicle functions 5 in the motor vehicle 1. By way of example, when the lane keeping assistance 22 is reactivated despite an activation request from another customer vehicle function 6, the vehicle is kept in the lane in accordance with the control commands from the lane keeping assistance 22 executed by the vehicle control 3.

Figure 2:
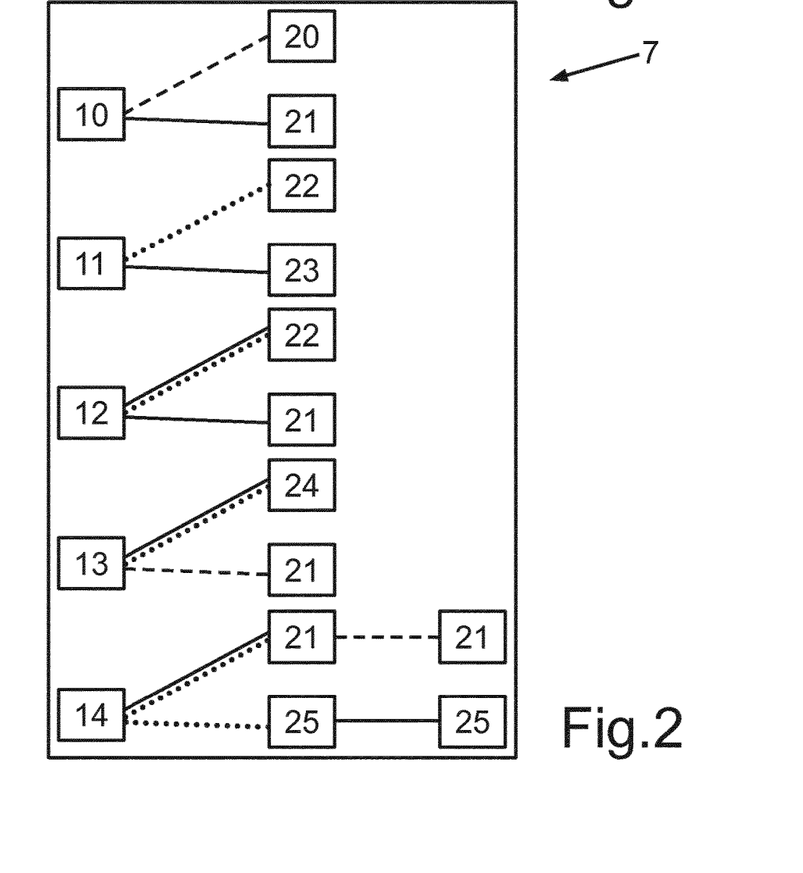
FIG. 2 shows a schematic illustration of a selection routine for determining activation states of customer vehicle functions.

Various transition scenarios are illustrated in FIG. 2, which can determine the activation states of the participating customer vehicle functions 6 in the framework of the selection routine 7. These activation states for the already active customer vehicle functions 6 and currently inactive customer vehicle functions 6 that have sent an activation request to the evaluation unit 4 are then sent to the corresponding customer vehicle function 6 and the vehicle control 3.

There may be a plurality (e.g., five) distinct transition scenarios in the framework of the selection routine 7. The individual activation states assigned to the individual customer vehicle functions 6 in FIG. 2 and transmitted therefrom, are indicated by lines, wherein a solid line indicates an active state, a broken line indicates an inactive state, and a dotted line indicates a paused state.

In the case of a takeover 10, the vehicle function 5 is activated by control commands from a previously inactive customer vehicle function 6 that has sent an activation request to the evaluation unit 4. If the cruise control 20 in the form of a customer vehicle function 6 in the motor vehicle 1 has been active so far, when an adaptive cruise control 21 issues an activation request, the control of the vehicle function 5 is taken over by the previously inactive adaptive cruise control 21 through control commands. The cruise control 20 is thus sent the inactive activation state, and the adaptive cruise control 21 is sent the active activation state, and these activation states are then implemented by the corresponding customer vehicle functions 6.

In the case of an override 11, the vehicle function 5 may be activated by control commands from the currently inactive customer vehicle function 6 that has sent an activation request to the evaluation unit 4, without deactivating the previously active customer vehicle function 6. If, for example, a lane keeping assistance 22 is currently activated in the form of the customer vehicle function 6, such an override 11 is implemented when a lane changing assistance 23 issues an activation request. The lane keeping assistance 22 is then paused, e.g., it is put in a standby mode, while the lane changing assistance 23 is assigned the active activation state, and can therefore control the motor vehicle 1 with its control commands. As soon as the lane change that the lane changing assistance 23 wants to carry out is completed, the lane changing assistance 23 is deactivated and the lane keeping assistance 22 changes its state from paused back to active.

In the case of a transition scenario in the form of a parallel activation 12, the vehicle function 5 in the motor vehicle 1 may be controlled by control commands from the active and the currently inactive customer vehicle functions 6. If, for example, a lane keeping assistance 22 is first active, an activation request from an adaptive cruise control 21 results in such a parallel activation 12. Because the lane keeping assistance 22 only engages in the lateral control of the motor vehicle, while the adaptive cruise control 21 engages in the longitudinal control of the motor vehicle 1, both customer vehicle functions 6, i.e. the lane keeping assistance 22 and the adaptive cruise control 21 can be active at the same time, without resulting in conflicts in the control of the motor vehicle 1 by the vehicle control 3. In the case of a parallel activation 12, the already active customer vehicle function 6, e.g., the lane keeping assistance 22 in this example, may have been paused after or prior to the activation request from the other customer vehicle function 6, the adaptive cruise control 21 in this example, and remains in this state.

In the example of a parallel activation 12 of customer vehicle functions 6 that engage with the same vehicle functions 5, it may be decided how the vehicle 1 will be controlled using predetermined provisions. If the already active customer vehicle function 6 is a speed limiter that defines a maximum speed, and the previously inactive customer vehicle function 6 is a cruise control 20, these to customer vehicle functions 6 can be activated in parallel. In some examples, the speed limiter defines a maximum speed, however, which cannot be exceeded by control commands from the cruise control 20. A provision regarding a maximum value for the activation of the corresponding vehicle control 5 is therefore defined in this example. If the two customer vehicle functions 6 that are active in parallel are an emergency braking assistance and an adaptive cruise control 21, however, by way of example, instead of a maximum value, it can be provided that in the case of a braking command from both of the customer vehicle functions 6, the stronger braking of the motor vehicle 1 is always carried out by the vehicle control 3.

In the prevention scenario 13, the vehicle function 5 for the currently inactive customer vehicle function 6 that has sent an activation request to the evaluation unit 4 is activated. Such a prevention 13 is carried out, for example, when the previously activated customer vehicle function 6 is an advanced driver assistance system 24, while, when it is active, an activation request from the adaptive cruise control 21 is received by the evaluation unit 4. The activation request from the adaptive cruise control 21 is not granted in this situation, i.e. the adaptive cruise control 21 is assigned and sent the inactive activation state, and the advanced driver assistance system 24 remains in its previously active or paused state. This transition scenario may take place here because the advanced driver assistance system 24 replaces all other driver assistance systems on a highway, e.g., other customer vehicle functions 6, because it is configured for fully autonomous driving on highways, such that, e.g., the adaptive cruise control 21 customer functions are already carried out by corresponding control commands from the advanced driver assistance system 24. In this case, activation of the adaptive cruise control 21 is not permitted.

Another transition scenario may be configured as a reservation 14 in the selection routine 7. With a reservation 14, the vehicle function 5 is only controlled by control commands from the currently inactive customer vehicle function 6 that has sent an activation request to the evaluation unit 4, after predetermined activation conditions have been satisfied. If, for example, a motor vehicle 1 is driving on a road with an activated or paused adaptive cruise control 21, selection of a parking assistance 25, e.g. through actuation of a control element in the vehicle interior, first results in the reservation transition scenario 14. The parking assistance 25 is then paused through corresponding signals sent from the evaluation unit 4, until an actual parking space for the motor vehicle 1 has been found and selected. It then changes the activation state of the parking assistance 25 from paused to active, while the previously active customer vehicle function 6, the adaptive cruise control 21, is assigned the inactive activation state.

Instead of the aforementioned driver assistance systems serving as the customer vehicle functions 6, actuation of a control element by the user of the motor vehicle 1 and the associated control commands can also be regarded as customer vehicle functions 6 in a motor vehicle 1 that has electric brakes, steering, and/or acceleration. If this is the case, in addition to the transition scenarios shown in FIG. 2, other predefined selection criteria may need to be taken into account in the framework of the selection routine 7. By way of example, it may be the case that a braking intention on the part of the user of the motor vehicle 1 overrides any other control commands from other customer vehicle functions 6, i.e. a manual braking by the user of the motor vehicle 1 always results in an override 10. Such an override 11, resulting from a braking intention on the part of the user, may only apply to certain, already active, customer vehicle functions 6, while with other customer vehicle functions 6, e.g. cruise control 20, which are controlled in parallel 12, the customer vehicle function 6 that has the stronger braking signal will be given priority, regardless of whether this is the signal indicating the braking intention on the part of the driver, or it is a braking defined by corresponding control commands from the cruise control 20.

The selection routine 7 may also be repeated in predetermined intervals and/or each time a revised activation state of a customer vehicle function is transmitted, such that current activation states are sent constantly to the corresponding customer vehicle functions 6. The selection routine 7 may typically be repeated every 20 milliseconds.

If numerous customer vehicle functions 6 each send activation requests to the evaluation unit 4, these activation requests are checked sequentially, starting with the first reception of a valid activation request by the evaluation unit 4, and evaluated using the selection routine 7 for coordinating the customer vehicle functions 6. If, for example, there is a takeover 10 by the adaptive cruise control 21 of the previously activated cruise control 20, when another activation request is received, e.g. the parking assistance 25, the selection routine 7 is not carried out for the already overridden cruise control 20 and the parking assistance 25. Instead, the selection routine 7 is only carried out for the now active adaptive cruise control 21 and the parking assistance 25, resulting in the reservation transition scenario 14. If instead, there is an activation request from the lane change assistance 23 while the lane keeping assistance 22 is already activated, the two customer vehicle functions 6 are controlled in parallel 12. With a subsequent activation request from the advanced driver assistance system 24, the selection routine 7 is carried out for both the lane keeping assistance 22 as an active customer vehicle function 6 and the lane changing assistance 23 as the previously active customer vehicle function 6. In this case, both selection routines result in a takeover 10 by the advanced driver assistance system 24, such that the advanced driver assistance system 24 is ultimately the only customer vehicle function 6 in the motor vehicle 1 that is active.

In addition to the activation request and the associated control commands, the individual customer vehicle functions 6 can also send their functions to the evaluation unit 4 in the form of task keys. In the case of the parking assistance 25, such a task key would be called "parking," for example. These task keys are provided to the evaluation unit 4 as stored information, such that ultimately any number of other customer vehicle functions 6 can be integrated in the control system 2, because they are either already stored therein through their task keys, such that corresponding selection criteria and information are available to the selection routine 7, or the necessary information regarding the further customer vehicle functions 6 can be sent to the evaluation unit 4 in a software update.

On the whole, the examples herein show that it is possible to coordinate and carry out numerous customer vehicle functions 6 successively or in parallel with the control system 2 for a motor vehicle 1. For this, an evaluation unit 4 in the vehicle control 3 for the motor vehicle 1 is configured to determine whether a customer vehicle function 6 that has sent an activation request is to be activated, deactivated, or paused, according to a predetermined selection routine 7. The activation states determined in this manner are sent to both the customer vehicle functions 6 as well as the vehicle control 3, such that it can ultimately control various vehicle functions 5 in the motor vehicle 1, taking these assigned activation states into account, in accordance with corresponding control commands from the individual active customer vehicle functions 6 for executing their customer functions.

LIST OF REFERENCE SYMBOLS

1 motor vehicle
2 control system
3 vehicle control
4 evaluation unit
5 vehicle function
6 customer vehicle function
7 selection routine
10 takeover
11 override
12 parallel control
13 prevention
14 delay (reservation)
20 cruise control
21 adaptive cruise control
22 lane keeping assistance
23 lane changing assistance
24 advanced driver assistance system
25 parking assistance

The invention claimed is:

1. A control system for a motor vehicle for activating customer vehicle functions, comprising
an evaluation unit;
a central vehicle control system, operatively coupled to the evaluation unit, the central vehicle control system comprising (i) a plurality of vehicle functions relating to the operation of the motor vehicle, and (ii) a plurality of customer vehicle functions relating to an at least partially automated operation of the vehicle function, wherein the customer vehicle functions are configured to transmit activation requests relating to the vehicle functions and associated control commands for their respective customer functions to the evaluation unit,
wherein the evaluation unit is configured to determine a predetermined activation state assigned to a currently active customer vehicle function and to a currently inactive customer vehicle function, according to a predetermined selection routine, and wherein the currently inactive customer vehicle function is configured to transmit an activation request, and to send the assigned activation states to a corresponding customer vehicle function,
and wherein the central vehicle control system is configured to control the vehicle functions in the motor vehicle according to the respective control commands from the corresponding customer vehicle functions for executing the respective customer functions using the activation states.

2. The control system of claim 1, wherein the plurality of vehicle functions of the central vehicle control system comprise at least some of steering, braking, and acceleration of the motor vehicle.

3. The control system of claim 2, wherein the customer vehicle functions comprise a driver assistance for the motor vehicle.

4. The control system of claim 1, wherein the evaluation unit is configured to distinguish between the active, inactive, and paused activation states of a customer vehicle function.

5. The control system of claim 1, wherein, if no customer vehicle function is activated, the evaluation unit is configured to grant permission for activation to the first currently inactive customer vehicle function that sends an activation request with the activation state sent to this customer vehicle function.

6. The control system of claim 1, wherein, if a customer vehicle function is already activated, the evaluation unit is configured to
determine a predetermined transition scenario between customer vehicle functions using a selection routine as soon as it receives the activation request from one of the currently inactive customer vehicle functions, and
assign and send a predetermined activation state to each of the customer vehicle functions corresponding to the determined transition scenario.

7. The control system of claim 6, wherein the evaluation unit is configured to determine predetermined transition scenarios between customer vehicle functions to coordinate two respective customer vehicle functions to one another, the predetermined transition scenarios comprising one of:
takeover of the control of the vehicle function through control commands from a currently inactive customer vehicle function,
override of the control of the vehicle function through control commands from the currently inactive customer vehicle function, without deactivating an active customer vehicle function,
parallel control of the vehicle functions through control commands from the active and the currently inactive customer vehicle functions,
prevention of control of the vehicle functions through control commands from the currently inactive customer vehicle function, and
reservation of the control of the vehicle functions through control commands from the currently inactive customer vehicle function until predetermined activation conditions are satisfied.

8. The control system of claim 6, wherein the evaluation unit is configured to carry out the selection routine in predetermined intervals, and transmit current activation states determined thereby to the corresponding customer vehicle functions.

9. The control system of claim 8, wherein, if a customer vehicle function transmits activation requests to the evaluation unit within the same time interval, the customer vehicle function is configured to carry out the selection routine for each of the activation requests in an order in which activation requests were received by the evaluation unit.

10. The control system of claim 1, wherein the customer vehicle functions are configured to activate at least one control element in the motor vehicle for manual control of a vehicle-side execution unit that is coupled to the control element for signal transfer, and mechanically decoupled from the control element.

11. The control system of claim 10, wherein, if the actuation is transmitted to the evaluation unit as a corresponding activation request, the evaluation unit is configured to perform further predefined selection criteria of the selection routine.

12. The control system of claim 1, wherein the customer vehicle functions are configured to transmit a task key describing the customer function to the evaluation unit, and wherein the vehicle control is configured to offer predetermined functions, the task keys of which are stored in the evaluation unit, and wherein additional customer vehicle functions can be integrated in the control system if the respective customer functions for the customer vehicle functions can be identified with the task keys known to the evaluation unit.

13. A method for operating a control system in a motor vehicle for coordinating and carrying out customer vehicle functions, comprising:
    transmitting an activation request relating to vehicle functions relating to the operation of the motor vehicle, and associated control commands for respective customer functions relating to an at least partially automated operation of the vehicle function currently inactive in an evaluation unit;
    assigning a predetermined activation state to a currently inactive customer vehicle function that has sent out an activation request, and/or to an already active customer vehicle function according to a selection routine;
    transmitting an assigned activation state to a corresponding customer vehicle functions and vehicle control,
    executing the respective customer functions by the vehicle control in accordance with respective control commands form the corresponding customer vehicle functions.

14. The method of claim 13, wherein the plurality of vehicle functions comprise at least some of steering, braking, and acceleration of the motor vehicle.

15. The method of claim 14, wherein the customer vehicle functions comprise a driver assistance for the motor vehicle.

16. The method of claim 13, further comprising distinguishing, via the evaluation unit, between the active, inactive, and paused activation states of a customer vehicle function.

17. The method of claim 13, further comprising granting permission, if no customer vehicle function is activated, for activation to a first currently inactive customer vehicle function that sends an activation request with the activation state sent to this customer vehicle function.

18. The method of claim 13, further comprising, if a customer vehicle function is already activated:
    determining a predetermined transition scenario between customer vehicle functions using a selection routine as soon as it receives the activation request from one of the currently inactive customer vehicle functions, and
    assigning and sending a predetermined activation state to each of the customer vehicle functions corresponding to the determined transition scenario.

19. The method of claim 18, further comprising determining predetermined transition scenarios between customer vehicle functions to coordinate two respective customer vehicle functions to one another, the predetermined transition scenarios comprising one of:
    takeover of the control of the vehicle function through control commands from a currently inactive customer vehicle function,
    override of the control of the vehicle function through control commands from the currently inactive customer vehicle function, without deactivating an active customer vehicle function,
    parallel control of the vehicle functions through control commands from the active and the currently inactive customer vehicle functions,
    prevention of control of the vehicle functions through control commands from the currently inactive customer vehicle function, and
    reservation of the control of the vehicle functions through control commands from the currently inactive customer vehicle function until predetermined activation conditions are satisfied.

20. The method of claim 18, further comprising carrying out the selection routine in predetermined intervals, and transmitting current activation states determined thereby to the corresponding customer vehicle functions.

* * * * *